United States Patent Office
3,667,842
Patented June 6, 1972

3,667,842
IMAGING APPARATUS
Armistead Wharton, Henrietta, N.Y., assignor to
Xerox Corporation, Stamford, Conn.
Filed June 17, 1970, Ser. No. 46,948
Int. Cl. G03g 15/04
U.S. Cl. 355—8                                    12 Claims

ABSTRACT OF THE DISCLOSURE

A scanning optical system using one lens that projects multiple distinct images of portions of a single object at predetermined positions along the path of a moving non-planar receptor. The lens projects light rays that are divided by strategically placed reflecting surfaces. The input can be transparent or opaque and is projectable at various magnifications. Varying processing equipment is operatively placed along the path of the moving image receptor. In a machine for automatically producing images from photoelectrophoretic suspensions using a cylindrical transparent image receptor which is exposed and re-exposed during one cycle of rotation, imaging electrodes are placed at the predetermined positions where the multiple images are projected from the object.

This invention relates to multiple exposure techniques and more particularly to machines employing multiple scanning exposure techniques.

Since the new invention of photoelectrophoresis was disclosed for forming black and white or full color images, various machine embodiments have been envisioned to accommodate this imaging technique in an automated machine environment. The basic iventions are described in Patent Nos. 3,383,993; 3,384,565; and 3,384,566. They disclosed how to produce a visual image at one or both of two electrodes between which photoelectrophoretic particle suspensions are placed. The particles are photosensitive and appear to undergo a net change in charge polarity or a polarity alteration by interaction with one of the electrodes upon exposure to activating electromagnetic radiation. Mixtures of two or more differently colored particles can secure various colors of images. The particles will migrate from one of the electrodes under the influence of an electric field when struck with energy of a wavelength within the spectral response curve of the colored particles.

A continuous imaging machine was disclosed in Pat. No. 3,427,242. Depicted is apparatus for forming continuous images from photoelectrophoretic suspensions by projection of an original utilizing a system for scanning an object and passing the image rays through the transparent surface of a cylindrical electrode.

Image formation using the photoelectrophoretic imaging system described above is enhanced in many cases by subjecting the photoelectrophoretic particles to imaging conditions more than once. The image produced by re-exposing the photoelectrophoretic imaging particle suspension to substantially the same image light pattern and electric field more than once is enhanced by the removal of particles from areas where there was insufficient illumination to previously cause migration of particles from one electrode to another. If a machine such as that disclosed in Pat. No. 3,427,242 were to attempt to enhance images by re-exposure under imaging conditions a second time, it would require a second revolution of the image forming electrode in that machine. This reduces the speed and efficiency of the machine by half or more depending on the number of imaging passes determined best for full image enhancement. It was in search of a system to provide multiple exposures of an image receptor during minimum movement of the image receptor that this invention was conceived and developed.

Therefore, it is an object of this invention to improve apparatus for automatically producing images. Another object of this invention is to subject photosensitive materials to a plurality of exposures within one cycle of the imaging apparatus.

Yet another object of this invention is to improve apparatus for multiple projection of light rays for forming registered images on moving members. Still another object is to optically re-expose moving image receptors to re-enforcing image light rays in a single cycle of movement.

Another object of this invention is to project images from a flat object plane to multiple positions on an imaging member. A further object is to improve methods of projecting multiple images from a single object.

These and other objects of this invention are accomplished by scanning an optical object through a single lens and dividing the optical output to a plurality of imaging positions located along the path of a moving non-planar image member. The optical path is divided for directing the image light rays to the imaging positions. At the imaging positions is processing equipment for forming photoelectrophoretic images from photoelectrophoretic imaging suspensions. The same and contiguous object portions are re-imaged at each of the imaging positions in synchronism with the moving imaging member. Hence, at each of the positions the image is reinforced by image light rays striking the image member in registration with the previous and/or the subsequent projections from the object to the imaging positions along the path of the moving imaging member.

The invention herein is described and illustrated in specific embodiments having specific components and features listed for carrying out the functions of the apparatus. Nevertheless, the invention need not be thought of as being confined to such a specific showing and should be construed broadly within the scope of the claims. Any and all equivalent structures or functions known to those skilled in the art can be substituted for the specific equivalent disclosed as long as the substituted portion achieves a similar result in a similar manner. It may be that other processes or apparatus will be invented having similar needs to those fulfilled by the invention described and claimed herein and it is the intention herein to describe an invention for use in environments other than that shown.

These and other objects and advantages of the invention will become apparent to those skilled in the art after reading the following description taken in conjunction with the accompanying drawings wherein.

There are certain terms of art used in conjunction with the photoelectrophoretic imaging process in which the invention is embodied which should be defined. The "injecting electrode" is so named because it is designed to optimize charge exchange with activated photosensitive particles during imaging. The term "photosensitive" for the purposes of this disclosure when used with reference to the photoelectrophoretic imaging suspension refers to the property of a particle which, once attracted to the injecting electrode, will alter its polarity and migrate away from the electrode under the influence of an applied electric field when exposed to activating electromagnetic radiation. The term "suspension" may be defined as a system having solid particles dispersed in a solid, liquid or gas. Nevertheless, the suspenion preferred for use in the disclosure herein is of the general type having a solid suspended in a liquid carrier. The term "imaging electrode" is used to describe that electrode which interacts with the injecting electrode through the suspension and which once contacted by activated photosensitive particles will minimize charge exchange with the particles. The imaging electrode is covered with a dielectric surface composed of a material having a volume resistivity preferably in the order of $10^7$ or greater ohm-cm. and a conductive member which is preferably a resilient material such as electrically conductive rubber used to give flexibility for the imaging electrode.

For photoelectrophoretic imaging to occur it is thought that these steps, not necessarily listed in the sequence that they occur, take place: (1) migration of the particles toward the injecting electrode due to the influence of an electric field; (2) the generation of charge carriers within the particles when struck with activating radiation within their spectral response curve; (3) particle deposition on or near the injecting electrode surface; (4) phenomena associated with the forming of an electrical junction between the particles and the injecting electrode; (5) particle charge exchange; (6) electrophoretic migration toward the imaging electrode; (7) particle deposition on the imaging electrode. This leaves an optically positive image on the surface of the injecting electrode.

Figure 1:
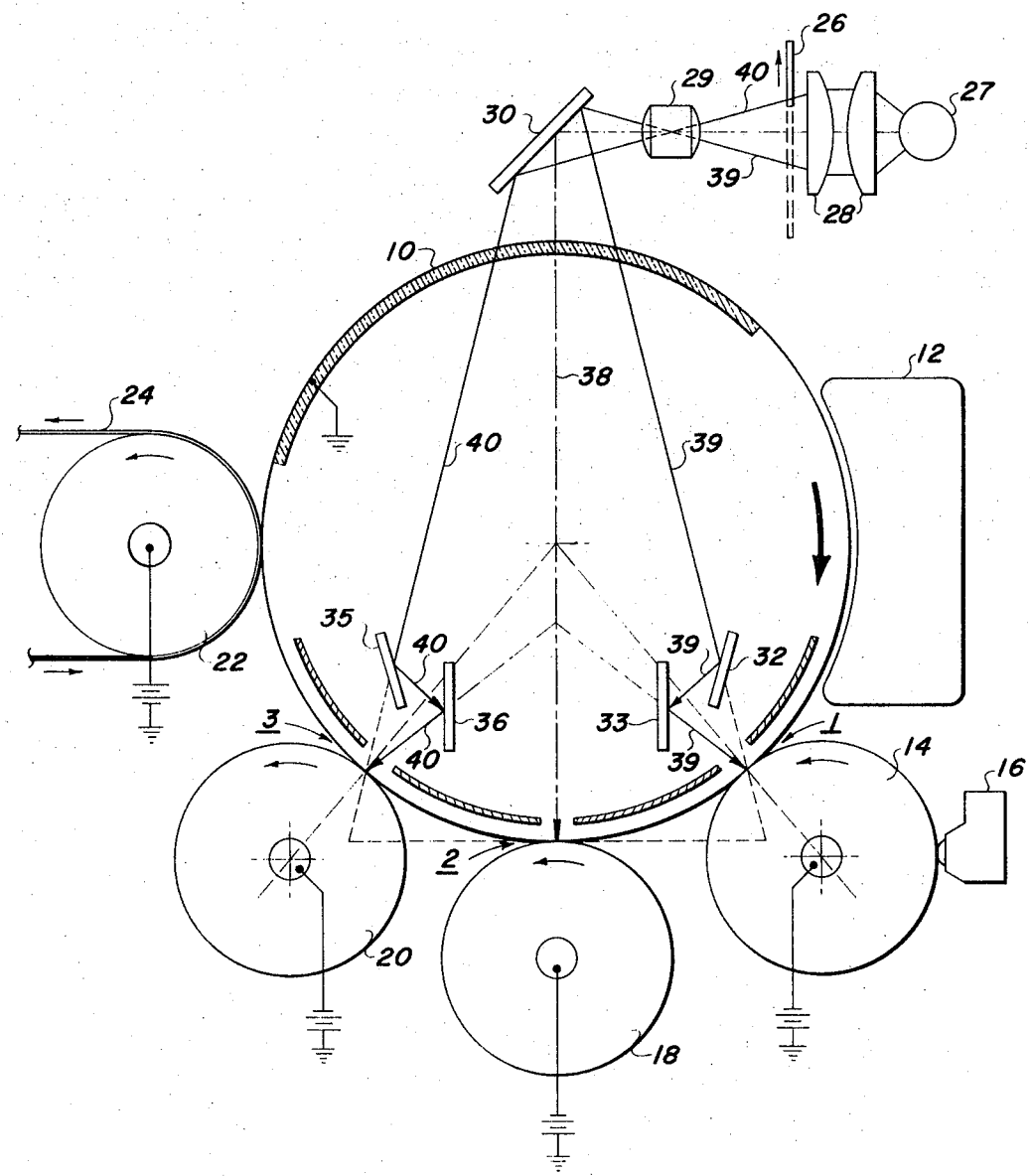
FIG. 1 is a schematic front view of an embodiment of an optical system and machine for forming photoelectrophoretic images in accordance with the invention herein.

Shown in FIG. 1 is one embodiment of the present invention utilized for rapid automatic imaging of photoelectrophoretic imaging suspensions. The optical arrangement shown is capable of projecting three coordinated images to three processing positions 1, 2 and 3 spaced around the periphery of the path traveled by an image receptor member 10. The image receptor member may be constructed as a sector of a cylinder made of an electrically conductive transparent material having a coating of electrically conductive tin oxide over a glass substrate and called NESA glass and made by the Pittsburgh Plate Glass Company. The image receptor functions as the injecting electrode in the photoelectrophoretic imaging process. Although NESA glass is specifically mentioned, any suitable material having a transparent, electrically conductive surface over a transparent substrate is usable. The image receptor sector would generally be housed in a cylindrical metal housing rotating about its own center of a curvature and having an opening in it for inserting the image receptor member. The housing should be torsionally rigid, driveable from either end and carried at both ends in suitable bearings. None of this external mechanism is shown in the schematic drawings herein, however, it would be known to one skilled in the art to so construct a machine. One such apparatus may be found in copending application Ser. No. 876,921 filed on Nov. 11, 1969 in the names of Egon M. Zurovskis and Raymond K. Egnaczak.

As the image receptor rotates through its path in the schematic illustration of a machine shown in FIG. 1, the surface of the image receptor 10 is cleaned by the cleaning mechanism 12. The mechanism can include brushes and/or a vacuum system or any suitable means for cleaning particles from a relatively smooth surface. As the image receptor continues to rotate through its path, it is contacted by a first imaging electrode, shown as roller 14. The first imaging electrode 14 serves an additional function of supplying suspension to the image receptor 10 by a suspension supply means 16. The suspension contacts the image receptor 10 at the first imaging position 1 in the nip between the image receptor 10 and the first imaging electrode 14. As it continues to rotate along its path, the image receptor contacts the second imaging electrode 18 at the imaging position 2 and the third imaging electrode 20 at the imaging position 3. Finally in its path of movement, the image receptor 10 is contacted by the transfer mechanism which operates through a transfer electrode 22 having an electrical bias generally opposite that of the imaging electrodes. Around the transfer electrode 22 and between it and the image receptor 10 is the transfer material 24 onto which the image from the image receptor is transferred for removal from the machine environment. The imaging electrodes and the image receptor sector as well as the transfer electrode are connected electrically to various electrical sources as indicated schematically in FIG. 1 and as discussed in more detail in the aforementioned patents describing the photoelectrophoretic imaging systems.

The system shown in FIG. 1 operates to form photoelectrophoretic images from a small transparency 26 used as the object for the optical system. The transparency is illuminated by a light source 27 passing light rays through condenser lenses 28 for imaging though the projection lens 29. Optionally, and depending on the image sense desired, a first reflection mirror 30 is inserted into the optical projection system. The light path is utilized at each of the three imaging positions by a straight projection from the reflecting surface 30 to the image position 2 and by use of two reflecting surfaces such as the mirrors 32 and 33 for projecting the light rays to the first imaging position 1 and the mirrors 35 and 36 for projecting the light rays to the third imaging position 3. The light paths 38, 39 and 40 are equivalent to each other for projecting focused, equally magnified images at the imaging positions 1, 2 and 3.

As it functions, the system involves moving an original with essentially full frame illumination, scanning at a rate proportionate to the movement of the image receptor at each of the imaging positions. The system operates mechanically with all moving parts rotating at a constant speed on fixed bearings thereby permitting a very simple drive system with a minimum of timing problems. The only exceptions would be the gating of the web for transfer and the object transport scan which can be cam driven off the constant speed rotating drive. A significant benefit of this optical system enables, in a single pass of the image receptor, three separate imaging positions. This can easily triple the speed of a system previously limited by optics to one imaging position per revolution of the image receptor.

Figure 2:
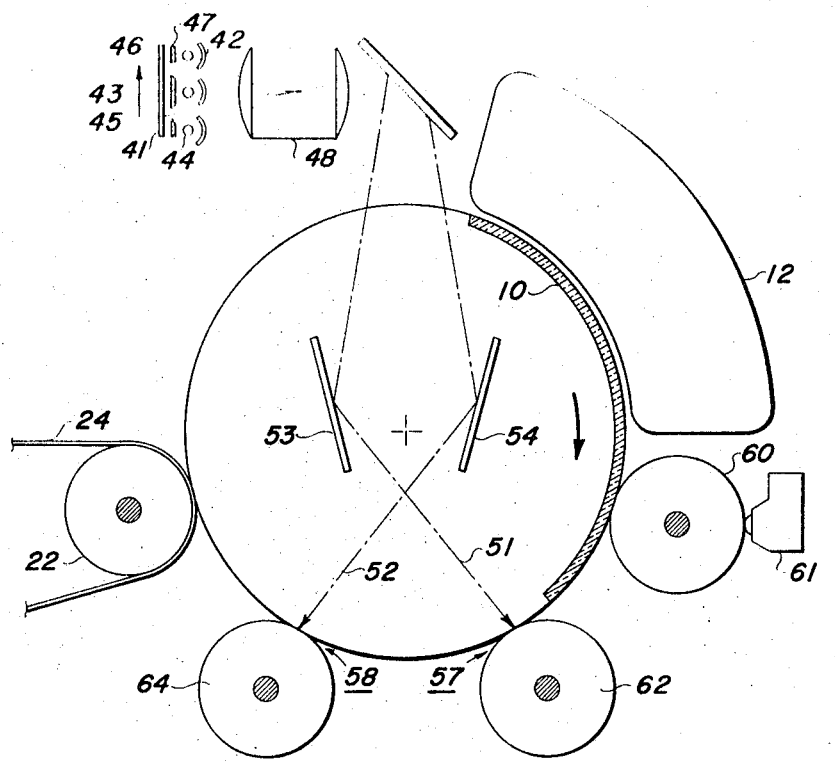
FIG. 2 is a schematic front view of an alternative embodiment for achieving the same result.

FIG. 2 is a modification of the apparatus of FIG.1 providing for two imaging positions in a single imaging pass with simplified optics. Incidentally, it has been found that two imaging passes in the photoelectrophoretic system is sufficient to provide acceptable copy of the input originals. In this figure an opaque original 41 is illuminated by light sources 42-44 which are suitably shielded to prevent ambient light from penetrating the optical system. The illumination slits are provided by slots 45 and 46 in an opaque housing 47. The reflected light through these slots is passed through a projection lens 48 where it is sequentially reflected by mirrors 53 and 54. As the opaque original traverses the slots, first slot 45 then the second slot 46, portions of its reflected light rays pass through the projection lens 48 first in path 51 and then in path 52 where they are sequentially reflected from mirrors 53 and 54 in the respective light paths. In this way, the image light rays in path 51 are projected to the first imaging position 57 and the second imaging path 52 terminates at an image plane at the imaging position 58. The arrangement of FIG. 2 also is well adapted for scanning and projecting two images of a transparency, illuminated by a lamp and condenser system as previously described in FIG. 1. As the injecting electrode 10 rotates through the imaging cycle of this apparatus it passes a cleaning mechanism 12 and an inking roll 60 which supplies photoelectrophoretic suspension from a supply 61 to the surface of the image receptor 10 but does not participate in the actual imaging steps. First imaging occurs at position 57, between the injecting electrode image receptor 10 and the first imaging electrode 62. The second imaging, occurring on the same cycle revolution as the first, is accomplished at the second imaging position 58 between the image receptor 10 and the second imaging electrode 64. Here the light ray 52 presents the same image at the imaging position 58 as the light ray 51 presented at the imaging position 57. Since the image receptor 10 speed is synchronized with the object scan, the same image is presented to the exact same portion of the image receptor 10 as it passes the two respective imaging positions. To end the cycle, the image receptor 10 surface passes the transfer roller 22 where the image is electrically removed from the surface of the image receptor 10 and transferred to the transfer material 24.

Figure 3:
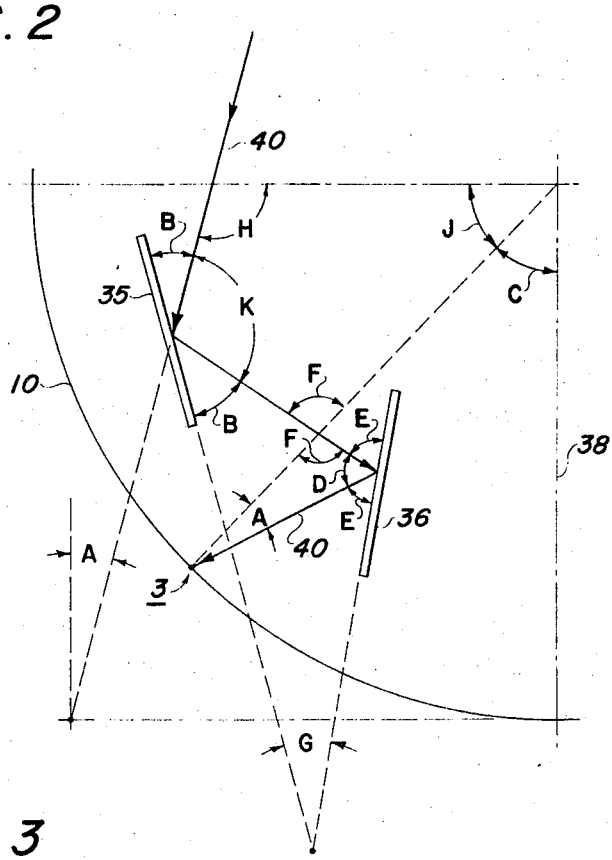
FIGS. 3 and 4 are representations of the mirror positioning of FIGS. 1 and 2 respectively.

FIG. 3 is a representation of the mirror positioning of FIG. 1 to mathematically illustrate the relationship of the projections to the imaging positions folded by the second and third mirrors in the imaging path. Shown here is a portion of the image receptor 10 and the mirrors 35 and 36 being like mirrors to that shown in FIG. 1. The light path imaging ray 40 strikes the mirrors 35 and 36 before striking the third imaging position 3. To illustrate the relationship of the various structural portions of this apparatus the following mathematical relations are presented. Given the angle C at the center of curvature of the rotating image receptor between the center line of the optical system and a radius drawn to the image position 3 and given the angle A between the optical input ray 40 and a line parallel to the center line of the optical system, the following relationships hold:

$$J = 90° - C$$
$$H = 90° + A$$
$$K = 180° - 2B$$
$$F = 360° - H - J - K$$
$$= 360° - (90° + A) - (90° - C) - (180° - 2B)$$
$$= 2B - A + C$$
$$D = 180° - A - F$$
$$= 180° - A - (2B - A + C)$$
$$= 180° - 2B - C$$
$$2E = 180° - D$$
$$= 180° - (180° - 2B - C)$$
$$= 2B + C$$
$$E = B + C/2$$
$$G = 180° - B - D - E$$
$$= 180° - B - (180° - 2B - C) - (B + C/2)$$
$$= C - C/2$$
$$= C/2$$

Since there are an infinite number of mirror combinations which would satisfy the requirements, the solution shown indicates one basic parameter, the angle G between the mirrors 35 and 36, is a constant and is equal to ½ the angle C.

Figure 4:
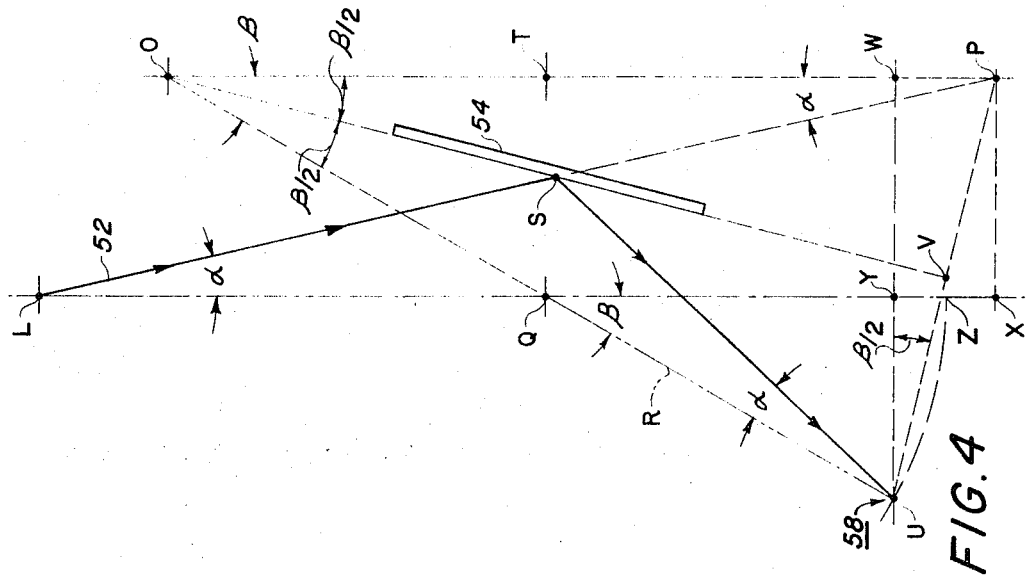

FIG. 4 is a representation of the apparatus shown in FIG. 2. In FIG. 4 the radius of curvature is designated by the letter R and is equal to the radius of the image receptor 10 and the path UZ through which it travels. The angle $\alpha$ is that angle subtended by a radius drawn to the imaging position 58 and the center line of the optical system. With these two parameters known, the location of the primary imaging point P and the plane of the mirror can be defined entirely in functions of R and $\beta$.

Figure 5:
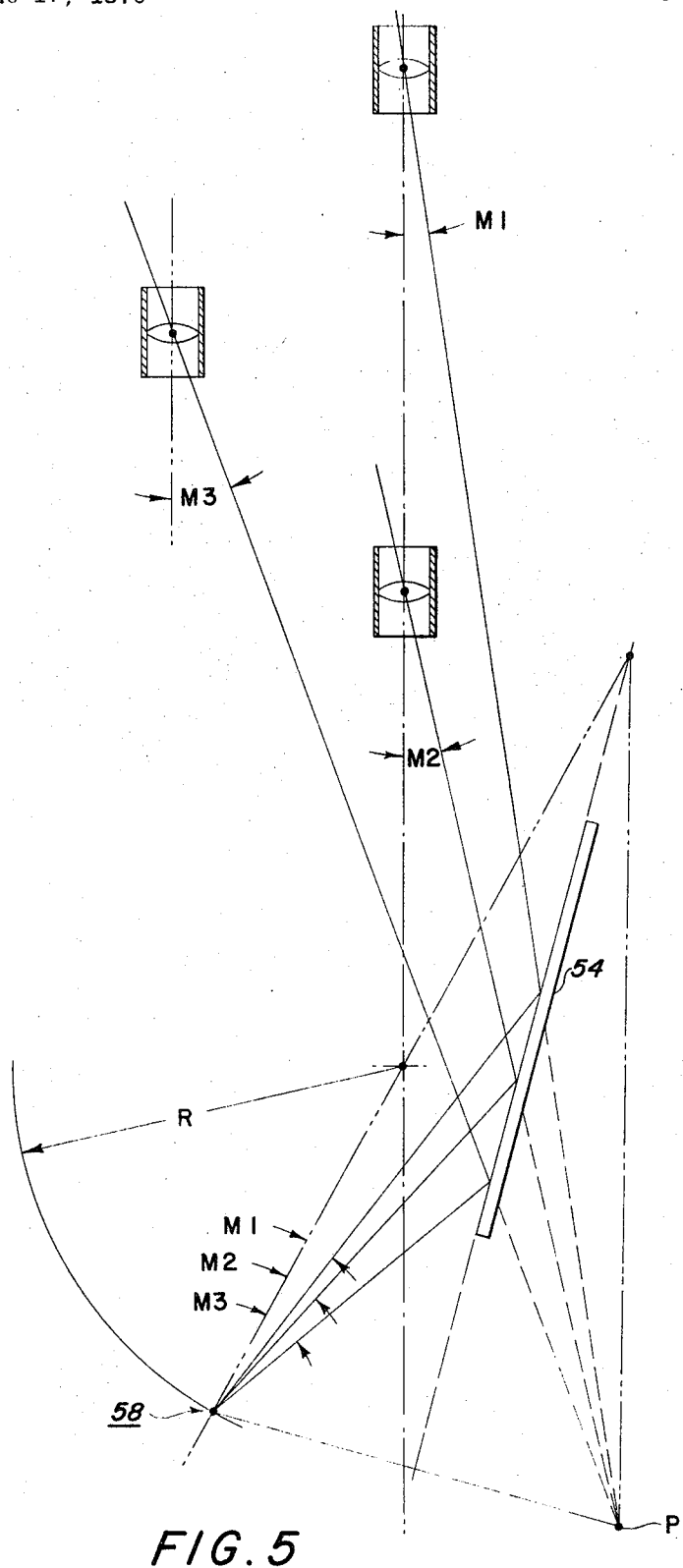
FIG. 5 is a diagramatic view demonstrating the compatibility of the embodiment of FIG. 2 with various magnification and lens positions.

FIG. 5 is a representation of the apparatus shown in FIGS. 2 and 4. This can be mathematically shown with reference to FIG. 4.

Given:

$$QU = R = \text{cylinder radius}$$
$$\angle UQX = \beta$$
$$XP = \text{arc } UZ = \frac{\pi R \beta}{180°} = WY = QT$$
$$SU = SP \text{ (equal optical path length)}$$

Since: $\angle LSO = \angle USV$ (reflection from mirror)
$\angle LSO = \angle PSV$ (vertical angles)
∴ $\angle USV = \angle PSV$
∴ $\triangle USV = \triangle PSV$ (2 sides and included $\angle$)
∴ $UV = VP$
∴ $\angle UVS = \angle PVS = 90°$ Then: $\triangle UOV = \triangle POV$ (2 sides and included $\angle$)
∴ $\angle UOV = \angle POV$
But $\angle UOV + \angle POV = \angle UOP = \angle UQX = \beta$
∴ $\angle UOV = \angle POV = \frac{1}{2}\beta$
Then $\angle PUW = \angle UOV = \frac{1}{2}\beta$ (sides $\perp$)
$WP = WU \tan \frac{1}{2}\beta$ $$WP = \left(R \sin + \frac{\pi R \beta}{180°}\right) \tan \frac{1}{2}\beta$$
$$WT = R \cos \beta$$
$$PT = R \cos \beta + \left(R \sin \beta + \frac{\pi R \beta}{180°}\right) \tan \frac{1}{2}\beta$$

Coordinates of point P are:

$$X_p = XP = \frac{\pi R \beta}{180°}$$
$$Y_p = PT = R \cos \beta + \left(R \sin \beta + \frac{\pi R \beta}{180°}\right) \tan \frac{1}{2}\beta$$

In $\triangle$ QTO the coordinates of point O are:

$$X_o = QT = \frac{\pi R \beta}{180°}$$
$$Y_o = OT = \frac{QT}{\tan \beta} = \frac{\pi R \beta}{180° \tan \beta}$$

∴ the plane of the mirror passes through point O with a slope of $\frac{1}{2}\beta$.

Figure 6:
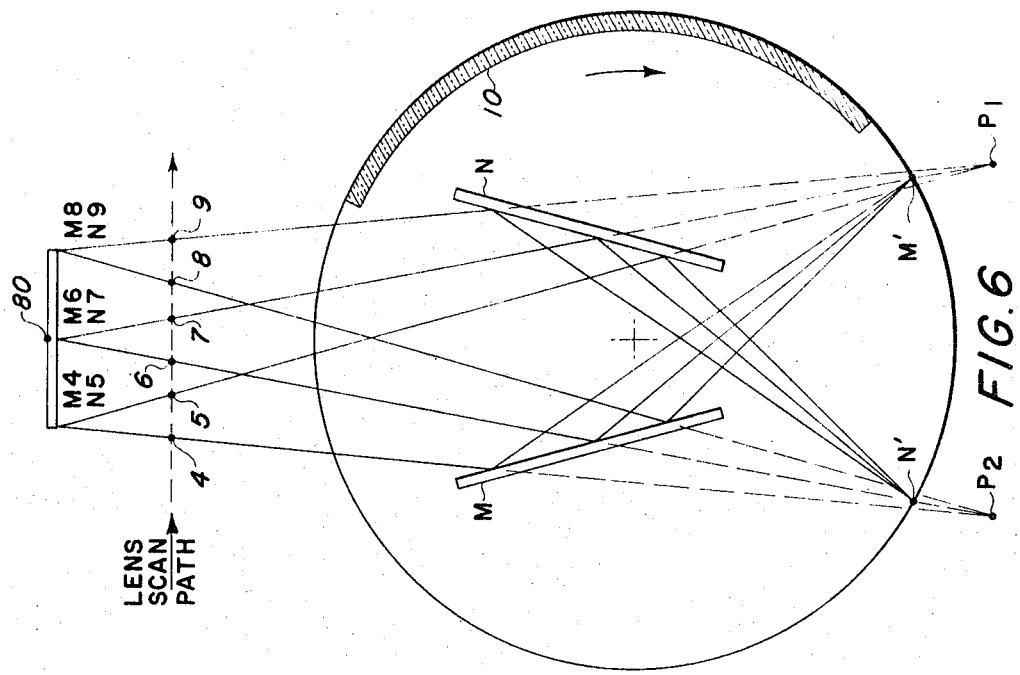
FIG. 6 is a schematic front view of an alternative embodiment of FIG. 2.

FIG. 6 illustrates an alternative embodiment of this invention using a fixed original and a moving lens to achieve the multiple single pass scanning accomplished by this invention. Illumination may be from the side of the original opposite the lens if the original is transparent or from flood or scanning illumination if the original is opaque. The image receptor 10 moves as it did in FIG. 2 and the mirrors designated M and N reflect light from the moving scanning lens to points M' and N' respectively. The numeral designations 4-9 are merely randomly picked points along the scan path of the lens. The M4-9 and N4-9 designations at the fixed original represent the end points or lines of the various light path lines shown in FIG. 6 that are reflected by the M or N mirror, respectively, to the imaging portions M' and N'. This illustrates that a given point on a fixed original is imaged by the lens at different positions along the path of travel of the lens onto each of the different mirrors for imaging at the predetermined path end imaging points. The imaging, of course, is synchronized with the movement of the image receptor 10 to present all the images in superposed relation on its surface. For example, the point 80 on the fixed original is designated M-6 and N-7. This means that it is reflected off the M mirror to the point M' when the lens is positioned at the position number 6 along the path of movement. The same point 80 is reflected off the N mirror to the N' position when the lens has moved to the number 7 position along its path of movement. At the same time, a point on the image receptor 10 has moved from the imaging position M' to the imaging position N'.

While this invention has been described with reference to the structures disclosed herein and while certain theories have been expressed, it is not confined to details set forth and this application is intended to cover such modifications or changes as may come within the purposes of the improvements and scope of the following claims.

What is claimed is:

1. An object plane, a means for maintaining an object at the object plane,
   a projection lens,
   a first imaging path from a first position on the object plane through the lens to a first imaging position,
   a second imaging path from a second position on the object plane through the lens to a second imaging position,
   means for producing relative movement between the object maintaining means and the lens,
   a member capable of maintaining a photoresponsive surface,
   means for moving said member through the multiple imaging positions in synchronized motion with the relative movement of the object maintaining means and the lens such that the same and contiguous object portions are reinforced at the same positions on the moving member at each of the plurality of imaging positions,
   reflecting means in at least one of the imaging paths to change the direction thereof and present the image rays therefrom at the imaging position thereof.

2. The apparatus of claim 1 wherein the member capable of maintaining a photoresponsive surface is at least a portion of a cylinder.

3. The apparatus of claim 2 wherein at least one of the imaging paths strike the member non-radially.

4. The apparatus of claim 2 wherein the imaging paths comprising reflecting means strike the member non-radially.

5. The apparatus of claim 1 wherein said imaging positions are in different planes from each other.

6. The apparatus of claim 1 including a third imaging path.

7. The apparatus of claim 1 wherein the object plane is flat.

8. The apparatus of claim 1 wherein the surface capable of being photoresponsive includes a photoelectrophoretic imaging suspension.

9. The apparatus of claim 8 including a first imaging electrode for interfacing with the member at the first imaging position,
   a second imaging electrode for interfacing with the member at the second imaging position, and
   means for coupling at least one of said electrodes and member to an electrical source.

10. The apparatus of claim 8 further including a plurality of imaging electrodes interfacing with said member at the plurality of imaging positions, and means for coupling at least one of said electrodes and members to an electrical source.

11. An imaging system for projecting an object a plurality of times on a member capable of maintaining a photoresponsive surface including
    an object plane capable of maintaining the object,
    a lens for projecting the light rays from the object plane,
    means for moving said member along a path including said plurality of imaging positions,
    means for optically scanning the object plane, and
    means for dividing the optical output from said lens to a plurality of imaging positions such that each portion of an object at the object plane is projected through the lens to each of the imaging positions as the same portion of the member passes that imaging position whereby the same and contiguous object portions are reinforced at the member at each of the imaging positions.

12. The apparatus of claim 1 including means for illuminating the object plane.

References Cited

UNITED STATES PATENTS

| | | | |
|---|---|---|---|
| 1,993,085 | 3/1935 | Carpenter et al. | 355—46 X |
| 1,906,509 | 5/1933 | Aschenbrenner | 355—46 |
| 3,427,242 | 2/1969 | Mihajlov | 204—300 |

SAMUEL S. MATTHEWS, Primary Examiner

E. M. BERO, Assistant Examiner

U.S. Cl. X.R.

355—3, 48, 46, 89, 111